(12) United States Patent  (10) Patent No.: US 9,342,725 B2
Vieta et al.  (45) Date of Patent: May 17, 2016

(54) IMAGE MANIPULATION UTILIZING EDGE DETECTION AND STITCHING FOR FINGERPRINT RECOGNITION

(71) Applicant: Apple Inc., Cupertino, CA (US)

(72) Inventors: William M. Vieta, Santa Clara, CA (US); Wayne C. Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 13/842,052

(22) Filed: Mar. 15, 2013

(65) Prior Publication Data

US 2014/0003682 A1    Jan. 2, 2014

Related U.S. Application Data

(60) Provisional application No. 61/666,760, filed on Jun. 29, 2012.

(51) Int. Cl.
*G06K 9/00* (2006.01)

(52) U.S. Cl.
CPC ........ *G06K 9/00013* (2013.01); *G06K 9/00026* (2013.01)

(58) Field of Classification Search
None
See application file for complete search history.

(56) References Cited

U.S. PATENT DOCUMENTS

| | | |
|---|---|---|
| 5,844,961 A | 12/1998 | McEvoy et al. |
| 5,872,834 A | 2/1999 | Teitelbaum |
| 5,995,630 A | 11/1999 | Borza |
| 6,041,410 A | 3/2000 | Hsu et al. |
| 6,181,807 B1 | 1/2001 | Setlak et al. |
| 6,323,846 B1 | 11/2001 | Westerman et al. |
| 6,518,560 B1 | 2/2003 | Yeh et al. |
| 6,556,935 B2 | 4/2003 | Morimura et al. |
| 6,570,557 B1 | 5/2003 | Westerman et al. |
| 6,628,810 B1 | 9/2003 | Harkin |
| 6,677,932 B1 | 1/2004 | Westerman |
| 6,719,200 B1 | 4/2004 | Wiebe |
| 6,766,040 B1 | 7/2004 | Catalano et al. |
| 6,888,536 B2 | 5/2005 | Westerman et al. |
| 6,914,517 B2 | 7/2005 | Kinsella |
| 6,930,707 B2 | 8/2005 | Bates et al. |
| 6,973,565 B2 | 12/2005 | Couillard |
| 7,039,224 B2 | 5/2006 | Hamid et al. |
| 7,043,061 B2 | 5/2006 | Hamid et al. |
| 7,203,347 B2 | 4/2007 | Hamid et al. |
| 7,274,807 B2 | 9/2007 | Hillhouse et al. |
| 7,327,859 B1 | 2/2008 | Chau |
| 7,356,169 B2 | 4/2008 | Hamid et al. |

(Continued)

OTHER PUBLICATIONS

Represent [online]. Dictionary.com 2015 [retrieved Jan. 30, 2015]. Retrieved from the Internet: <URL: http://dictionary.reference.com/browse/represent?s=t>,p. 1.

*Primary Examiner* — Nirav G Patel
(74) *Attorney, Agent, or Firm* — Brownstein Hyatt Farber Schreck, LLP (57) ABSTRACT

An error correction method and a mobile communication device incorporating the error correction method. The error correction method begins with receiving fingerprint image information that includes a set of swatches. A first one of the received swatches is matched to a second one of the swatches at an edge. A measure of fingerprint image manipulation is determined responsive to an amount of processing to perform and an amount of fingerprint image error. Then the fingerprint image information is manipulated in response to an optimum value of the measure.

12 Claims, 7 Drawing Sheets

(56) References Cited

U.S. PATENT DOCUMENTS

| | | |
|---|---|---|
| 7,385,381 B1 | 6/2008 | Mainguet |
| 7,400,749 B2 | 7/2008 | Hillhouse |
| 7,474,773 B2 | 1/2009 | Chau |
| 7,590,269 B2 | 9/2009 | Creasey et al. |
| 7,599,530 B2 | 10/2009 | Boshra |
| 7,616,786 B2 | 11/2009 | Setlak |
| 7,616,787 B2 | 11/2009 | Boshra |
| 7,688,314 B2 | 3/2010 | Abdallah et al. |
| 7,770,019 B2 | 8/2010 | Ferren et al. |
| 7,894,685 B2 | 2/2011 | Zhai et al. |
| 7,953,258 B2 | 5/2011 | Dean et al. |
| 7,970,185 B2 | 6/2011 | Kim et al. |
| 7,990,269 B2 | 8/2011 | Bork et al. |
| 8,073,204 B2 | 12/2011 | Kramer et al. |
| 8,131,026 B2 | 3/2012 | Benkley et al. |
| 8,190,907 B2 | 5/2012 | Tu |
| 8,411,913 B2 | 4/2013 | Zhang et al. |
| 8,520,913 B2 | 8/2013 | Dean et al. |
| 8,570,293 B2 | 10/2013 | Deng |
| 8,577,091 B2 | 11/2013 | Ivanov et al. |
| 8,625,861 B2 | 1/2014 | Aggarwal et al. |
| 8,698,594 B2 | 4/2014 | Erhart et al. |
| 8,995,729 B2 | 3/2015 | Marques et al. |
| 2003/0129965 A1 | 7/2003 | Siegel |
| 2003/0172027 A1 | 9/2003 | Scott |
| 2005/0238212 A1* | 10/2005 | Du et al. ............... 382/124 |
| 2006/0104483 A1 | 5/2006 | Harel et al. |
| 2006/0188132 A1 | 8/2006 | Shigeta et al. |
| 2007/0081698 A1 | 4/2007 | Hamid et al. |
| 2008/0317306 A1 | 12/2008 | Hamilton |
| 2009/0083850 A1 | 3/2009 | Fadell et al. |
| 2009/0232361 A1* | 9/2009 | Miller ............... 382/115 |
| 2011/0084711 A1 | 4/2011 | Chang et al. |
| 2011/0223888 A1 | 9/2011 | Esaki |
| 2012/0075452 A1 | 3/2012 | Ferren |
| 2013/0101186 A1 | 4/2013 | Walch et al. |
| 2013/0294660 A1 | 11/2013 | Heilpern |
| 2014/0003680 A1 | 1/2014 | Marciniak et al. |
| 2014/0015774 A1 | 1/2014 | Bussat et al. |
| 2014/0219520 A1 | 8/2014 | Myers |
| 2015/0071507 A1 | 3/2015 | Setlak |

\* cited by examiner

IMAGE MANIPULATION UTILIZING EDGE DETECTION AND STITCHING FOR FINGERPRINT RECOGNITION

CROSS-REFERENCE TO RELATED APPLICATION

This application claims benefit under 35 U.S.C. §119(e) to U.S. Provisional Patent Application No. 61/666,760, which was filed on Jun. 29, 2012, and entitled "Edge Detection and Stitching," which is incorporated by reference as if fully disclosed herein.

BACKGROUND

1. Field of the Disclosure

This application generally relates fingerprint image processing

2. Background of the Disclosure

Fingerprint recognition systems generally provide for collection of fingerprint images and comparing those images against a database of known fingerprint information. For example, after a set of fingerprint images for a known authorized user is collected and processed, an accessing user can be authorized by collecting one or more fingerprint images for that accessing user against known fingerprint information for that authorized user.

It sometimes occurs that collecting fingerprint images, whether from an authorized user or from a new user, involves collecting portions of the fingerprint information. For example, this can occur when the fingerprint sensor is only able to collect a portion of the fingerprint, such as when the fingerprint sensor is smaller than the entire fingerprint. This has the effect that constructing the entire fingerprint image can involve operating a processor to place and match adjacent portions of the fingerprint.

It sometimes occurs that collecting fingerprint images, whether from an authorized user or from a new user, involves collecting fingerprint information that is subject to blurring, motion, or other artifacts. For example, this can occur if the fingerprint sensor is operating while the user is moving their finger. This has the effect that constructing the entire fingerprint image can involve operating a processor to clean up image artifacts introduced by the user moving their finger.

Each of these examples, as well as other possible considerations, can cause difficulty for the fingerprint sensor, at least in that reconstruction of the entire fingerprint can take substantial processing power. When substantial processing power is involved, it may take substantial time for the processor to conduct its operations. It is possible that construction of the entire fingerprint can take enough time that the user becomes frustrated, and might shy away from using fingerprint recognition security.

BRIEF SUMMARY OF THE DISCLOSURE

This application provides techniques, including circuits and designs, which can receive information with respect to fingerprint images, or portions thereof, and which can be incorporated into devices using fingerprint recognition. This application also provides techniques, including devices which perform fingerprint recognition and methods which can be performed by those devices. Moreover, as described herein, fingerprint information can be maintained in memory or storage and manipulated by a computing device, in response to and interactively with a physical contact or proximity to one or more of a user's fingerprints.

In one embodiment, techniques can include providing a fingerprint recognition sensor in which one or more portions of each fingerprint image are examined for blurring, motion, and other artifacts. The degree of correction applied to each individual portion of each fingerprint image is responsive to a tradeoff between image quality and time needed for image capture. The degree of correction applied is also responsive to a target signal to noise ratio (SNR) as well as to a minimal acceptable signal to noise ratio. For example, lesser processing might achieve a minimal acceptable signal to noise ratio, while also achieving more rapid fingerprint image processing.

In one embodiment, techniques can include providing a fingerprint recognition sensor in which portions of each fingerprint image are combined to construct a unified fingerprint image. The correction applied to each portion of the fingerprint image is selected to minimize an amount of edge discontinuity between adjacent portions. The correction applied to each portion of the fingerprint image is also selected to minimize an amount of error introduced for that portion of the fingerprint image. For example, shifting or twisting a portion of the fingerprint image can reduce error in that portion, but can introduce discontinuity errors with neighboring portions.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

Fingerprint recognition systems provide for collection of fingerprint images and comparing those images against a database of known fingerprint information. Embodiments described herein may be configured to operate with a variety of sensors, including strip or swipe sensors, array or other two-dimensional sensors, and the like. Frequently, collecting fingerprint images, whether from an authorized user or from a new user, may involve collecting portions of the fingerprint information rather than entire fingerprint images, possibly because of sensor limitations (i.e. the fingerprint sensor being smaller than user's fingertip). In such cases, constructing the entire fingerprint image from the collected data may involve operating a processor to align and match adjacent portions of the fingerprint.

It also sometimes occurs that collected fingerprint images, or portions thereof, may be subject to blurring, motion, or other artifacts. For example, this may occur if the user is moving their finger during operation of the fingerprint sensor. Thus, constructing the entire fingerprint image may additionally involve operating a processor to clean up image artifacts introduced during collection.

Example embodiments, as described herein, include example error correction methods and example mobile communication devices incorporating these methods. Such example error correction methods may begin with receiving fingerprint image information that includes a set of swatches of image data. One swatch may be matched to another at an edge. A measure of fingerprint image manipulation may then be determined based on the amount of processing that is to be performed on the image data and the amount of fingerprint image error found. The fingerprint image information is then manipulated based on an optimum value of this measure.

Terminology

The following terminology is exemplary, and not intended to be limiting in any way.

The text "capacitive sensing element", and variants thereof, generally refers to one or more sensors that may sense data elements of any kind, including information sensed with respect to individual locations. For example and without limitation, a capacitive sensing element may sense data or other information with respect to a relatively small region of a fingerprint image.

The text "capacitive sensing information", and variants thereof, generally refers to sensed data of any kind, including information sensed with respect to individual locations. For example and without limitation, capacitive sensing information can include data or other information with respect to a relatively small region of a fingerprint image.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Fingerprint Sensor System

Figure 5:
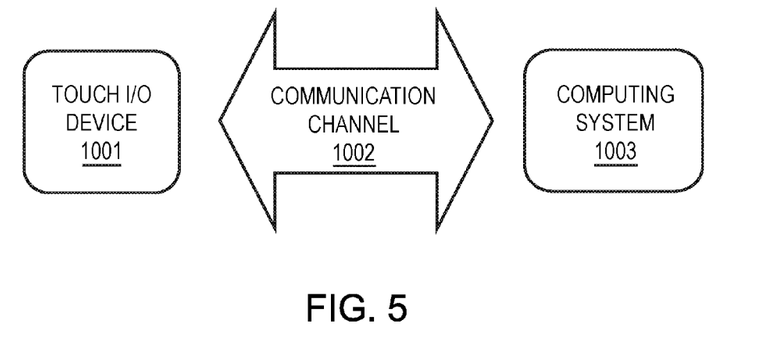
FIG. 5 shows a conceptual drawing of communication between a touch I/O device and a computing system.

FIG. 5 shows a conceptual drawing of communication between a touch I/O device and a computing system.

Figure 6:
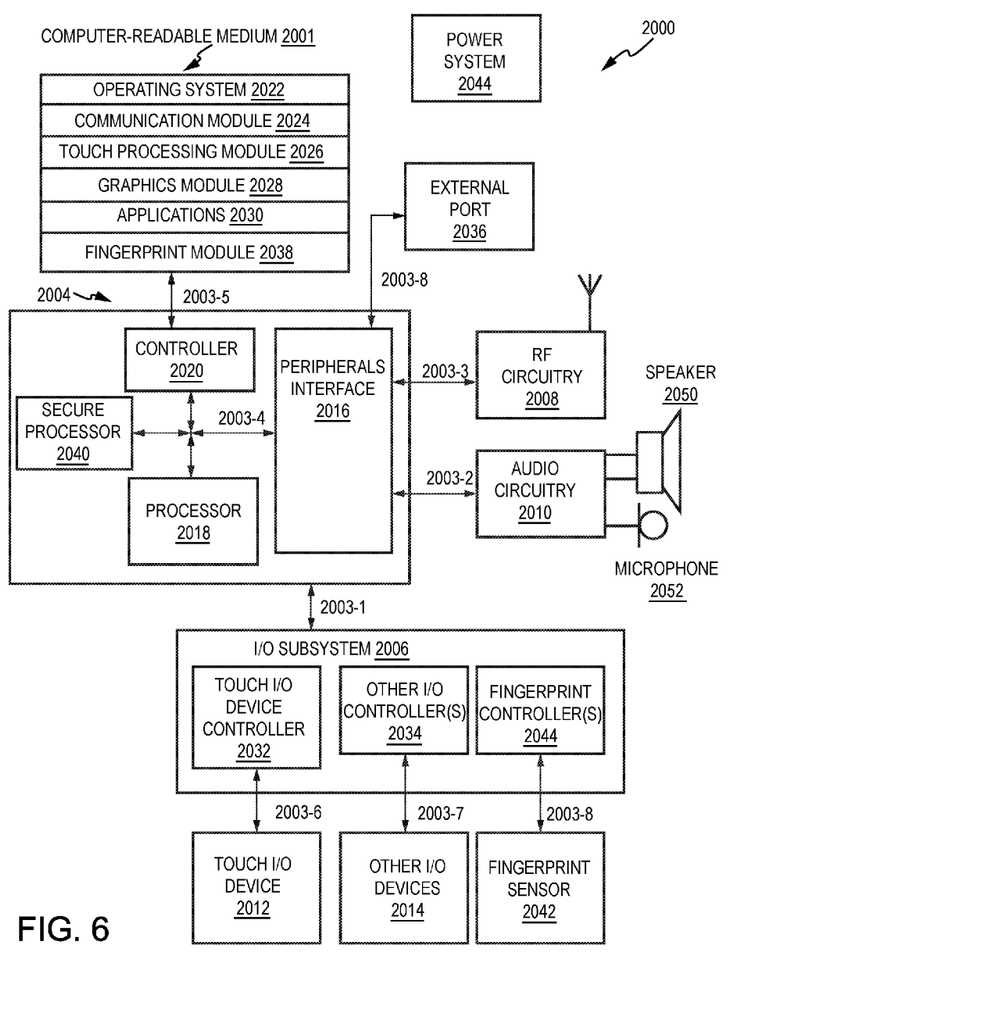
FIG. 6 shows a conceptual drawing of a system including a fingerprint recognition device.

FIG. 6 shows a conceptual drawing of a system including a fingerprint recognition device.

Described embodiments may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

For example, touch I/O device 1001 can interact with a user with the user touching the touch I/O device 1001 with the user's finger (or otherwise bringing the user's finger near to the touch I/O device 1001), with the effect that the touch I/O device 1001 can receive fingerprint image data, and optionally provide feedback to the user that the fingerprint image data was received.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures or fingerprints. A gesture or fingerprint may correspond to stationary or non-stationary, single or multiple, touches or near touches on touch I/O device 1001. A gesture or fingerprint may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture or fingerprint may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner. For example, feedback can include interaction with a user indicating (A) that one or more sets of fingerprint image information have been received, (B) that one or more sets of fingerprint image information have been enrolled in a database, (C) that one or more sets of fingerprint image information have been confirmed as associated with the user, or otherwise.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. A block diagram of one embodiment of system 2000 generally includes one or more computer-readable mediums 2001, processing system 2004, Input/Output (I/O) subsystem 2006, radio frequency (RF) circuitry 2008 and audio circuitry 2010 (FIG. 6). These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in the figure is only one example architecture of system 2000, and that system 2000 could have more or fewer components than shown, or a different configuration of components. The various components shown in the figure can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIGS. 1-4. Fingerprint sensing module 2038 may at least be execute to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad); the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. Secure processor 2040 may be implemented as one or more processing units. The operation of these various elements will now be described.

The fingerprint sensor 2042 may include one or more capacitive sensing elements configured to capacitively capture a series of images, or nodes. When taken together, these nodes may form a set of fingerprint image information. A collection of nodes may be referred to herein as a "mesh", "mosaic", "template", or other indicator of fingerprint information.

Each node of fingerprint information may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the fingerprint information.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as individual nodes, collections of nodes, or substantially complete fingerprint templates, may be stored in the computer-readable medium 2001 and accessed as necessary. In some embodiments, only the secure processor 2040 may access stored fingerprint data, while in other embodiments either the secure processor or the processor 2018 may access such data.

Fingerprint Sensor

Figure 1:
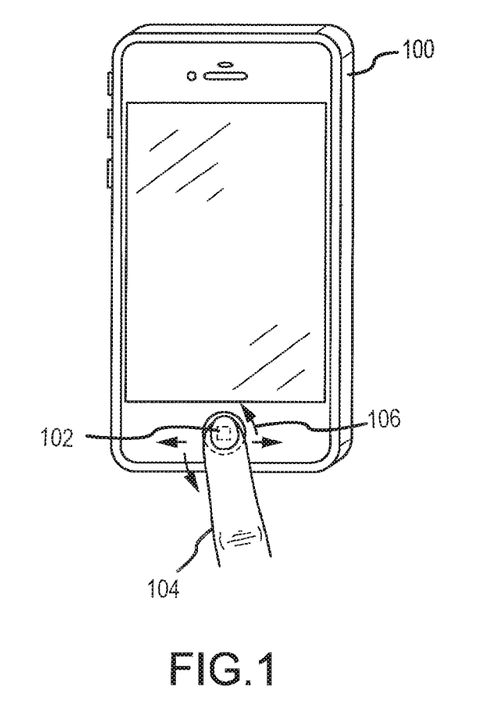
FIG. 1 shows a conceptual drawing of a fingerprint sensor included in a portion of a device.

FIG. 1 shows a conceptual drawing of fingerprint sensor 102 included in a portion of device 100. FIG. 1 also illustrates potential motion 106 of finger 104 during use of fingerprint sensor 102.

A device, such as a smart phone or a tablet computer, includes a fingerprint sensor, on or near which the user places their finger, with the effect that the fingerprint sensor can receive one or more fingerprint images. In one embodiment, the fingerprint sensor optionally includes the touch I/O device 2012 described herein, and includes one or more computing devices, such as the processor 2018 and the secure processor 2040 described herein. Moreover, the fingerprint sensor can include, or have access to, memory or storage in which it can maintain and manipulate fingerprint information, such as one or more databases of fingerprint information which can be used to manipulate and compare fingerprint information, as described herein.

In one embodiment, each database of fingerprint information can include a set of fingerprint image data, which can include a set of fingerprint image capacitive sensing information, such as responsive to the touch I/O device 2012 described herein. For example, each set of fingerprint image capacitive sensing information can include a block of fingerprint image capacitive sensing elements received in response to the touch I/O device 2012, and maintained in memory or storage included with or accessible to the secure processor 2040.

In one embodiment, it is possible that the finger print sensor is not large enough to capture an entire fingerprint at once, and can only capture a swatch of that fingerprint image. In one embodiment, it is also possible that the user might move their finger while the fingerprint sensor is capturing its swatch of that fingerprint image, with the effect that the swatch of the fingerprint image is subject to movement, roll, pitch, yaw, or other effects. For example, movement might include translation of the fingerprint image up, down, right, or left.

Individual swatches of the fingerprint image might be translated, rotated, or subject to other artifacts (such as blurring). This has the effect that the effort required for matching neighboring swatches of the fingerprint image might be significantly increased.

After reading this application, those skilled in the art would recognize that stitching of individual swatches of the fingerprint image is responsive to, and transformative of, real-world data such as fingerprint image data received from a user's fingerprint, and provides a useful and tangible result in the service of enrolling and comparing fingerprints in a biometric security context. Moreover, after reading this application, those skilled in the art would recognize that processing of fingerprint data by a computing device includes substantial computer control and programming, involves substantial records of fingerprint information, and involves interaction with fingerprint sensing hardware and optionally a user interface for fingerprint enrollment and authentication.

Edge Stitching

Figure 2:
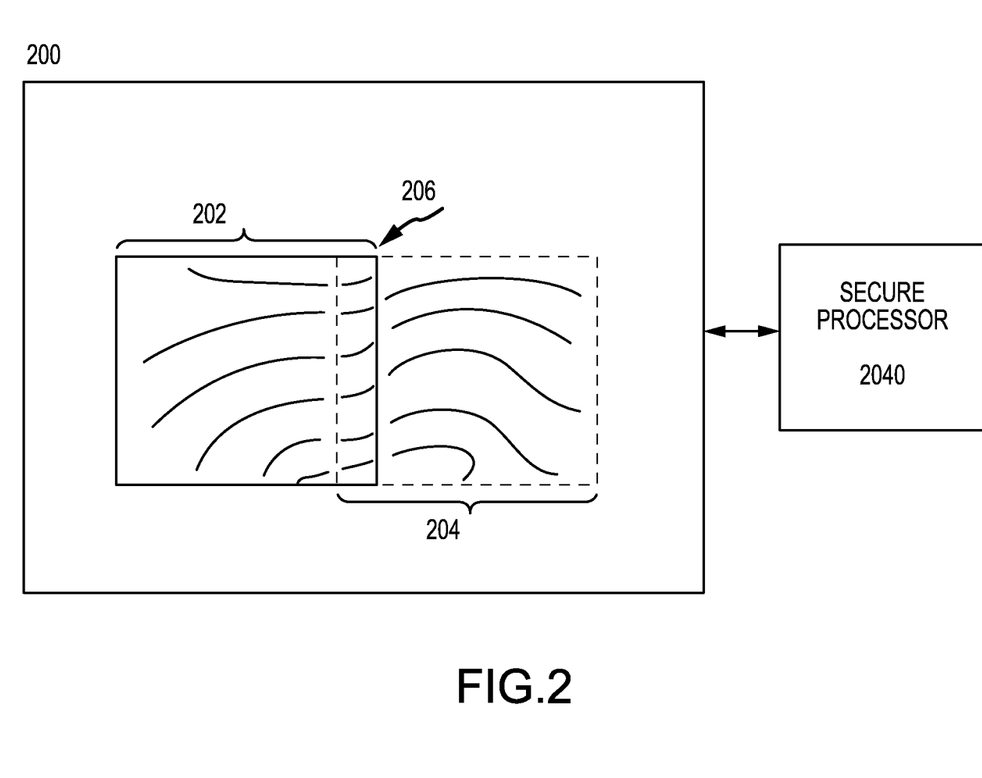
FIG. 2 shows a conceptual drawing of edge stitching of swatches of a fingerprint image.

FIG. 2 shows a conceptual drawing of edge stitching of swatches 202 and 204 of a fingerprint image.

In one embodiment, individual swatches 202 and 204 can include 8×8 tiles of capacitive sensing information, each representing a portion of a fingerprint image. A fingerprint recognition sensor (not shown) can be coupled to the fingerprint sensor, and can include instructions interpretable by a computing device to perform techniques, method steps, or operations, as described herein. As described herein, processed fingerprint image data can be maintained in memory or storage 200 and manipulated by a computing device, such as secure processor 2040, in response to and interactively with a physical contact or proximity to one or more of a user's fingerprints.

In one embodiment, the fingerprint recognition sensor receives those portions of the fingerprint image from the fingerprint sensor, and attempts to stitch together those portions of the fingerprint image. The fingerprint recognition sensor can perform stitching by observing an overlap between edges of neighboring swatches. For example as illustrated in FIG. 2, in cases in which individual swatches include 8×8 tiles of capacitive sensing information, edge overlap 206 between neighboring swatches 202 and 204 can include a border between those neighboring swatches, such as a 2×8 border of overlapping capacitive sensing information.

In one embodiment, it might occur that those individual swatches of the fingerprint image (such as the 8×8 tiles of capacitive sensing information) are motion blurred, are subject to noise or other image capture artifacts, are subject to edge discontinuities due to motion (such as translation, rotation, or otherwise), or otherwise are subject to information loss (either as individual swatches, or at edges between neighboring swatches, or both).

Information Loss

In one embodiment, the fingerprint recognition sensor attempts to adjust those swatches to recover from information loss, both from individual swatches, edges between neighboring swatches, and other possible sources of information loss. For a first example, the fingerprint recognition sensor attempts to adjust those individual swatches to recover from motion blurring and other motion artifacts. For a second example, the fingerprint recognition sensor attempts to adjust swatches (either individually or collectively) to recover from the edge discontinuities and other fingerprint image capture artifacts. In such examples, it is desirable to obtain a better match at the edge overlap between neighboring swatches.

In one embodiment, it might occur that it is possible to determine (at least to a partial degree of certainty) what information has been lost, either within individual swatches, or at the border between neighboring swatches, in response to techniques for adjusting those swatches (either individually or collectively). For a first example, it might be possible to determine, from examination of edge discontinuities or from examination of differences between neighboring swatches, whether one or more of the individual neighboring swatches was subject to motion blurring, or another fingerprint image capture artifact. For a second example, it might be possible to determine, from examination of edge discontinuities, what information was lost in one or more of the neighboring swatches. In one embodiment, in response to determining what information was lost, it might be possible to minimize edge discontinuities between neighboring swatches by appropriate application called signal processing techniques.

In one embodiment, the fingerprint recognition sensor can determine, in response to a degree of the print image quality (either measured globally, or measured at one or more individual swatches of the fingerprint image), whether or not to use the fingerprint image for enrollment in a fingerprint recognition system.

Error Correction

In one embodiment, the fingerprint recognition sensor attempts to adjust those swatches to obtain a better match at the edge overlap between neighboring swatches. As described above, those individual swatches might have been subjected to one or more artifacts of the fingerprint image capture process. Accordingly, the fingerprint recognition sensor attempts to invert one or more of those artifacts of the fingerprint image capture process. For a first example, the fingerprint recognition sensor can subject those swatches to blurring, filtering, and application of other signal processing techniques to swatches of the fingerprint image. For a second example, the fingerprint recognition sensor can apply one or more transforms such as translation and rotation, or more generally, any affine transform, to swatches of the fingerprint image.

In one embodiment, the fingerprint recognition sensor attempts to minimize an amount of error at the edge overlap between neighboring swatches. The fingerprint recognition sensor can attempt to minimize alignment error between neighboring swatches, with the intended effect of minimizing information loss at the edge overlap between neighboring swatches. For example, the fingerprint recognition sensor can review the effect of multiple distinct affine transformations, searching for a minimized degree of alignment error, or a minimized degree of edge discontinuity (such as might be due to twisting of one of the neighboring swatches with respect to another). In one case, a measure of alignment error at the edge overlap between neighboring swatches can be determined in response to one or more possible metrics. One such possible metric is "flow coherence", such as might be determined in response to a ridge flow for the fingerprint image.

Signal to Noise Ratio Versus Processing Time

Figure 3:
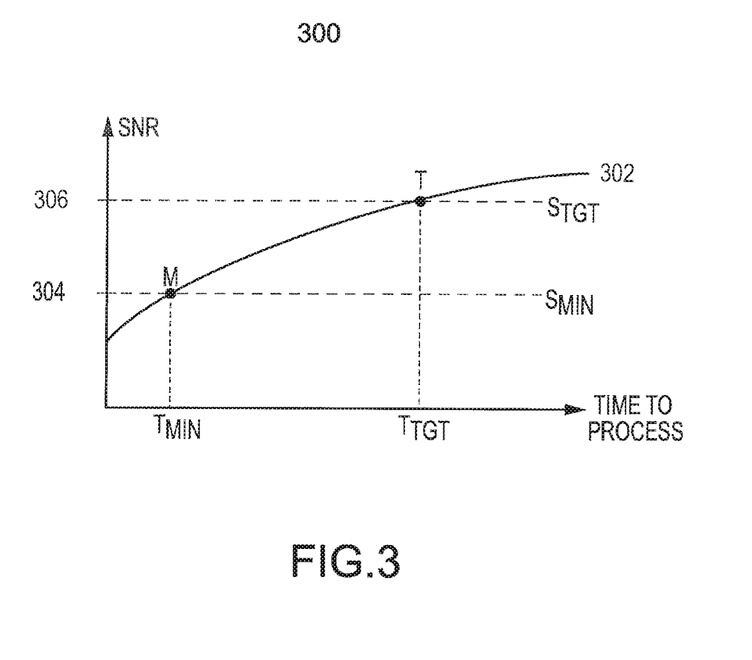
FIG. 3 shows a conceptual drawing of a comparison between achieved signal to noise ratio and image processing time.

FIG. 3 shows conceptual graph 300 to illustrate the relationship between achieved signal to noise ratio (SNR) and image processing time. Curve 302 represents data for an example image swatch. This example illustrates that a relatively short time period, $T_{MIN}$, may allow the example image swatch to be processed with minimum SNR 304, $S_{MIN}$, while a significantly time period, $T_{TGT}$, may be used to process example image swatch with target SNR 306, $S_{TGT}$.

In one embodiment, the fingerprint recognition sensor determines an amount of processing required for processing the fingerprint image information. The fingerprint recognition sensor determines an amount of missing information, from which it can calculate a signal to noise ratio (SNR). In one embodiment, the fingerprint recognition sensor maintains a target signal to noise ratio, which is a value of signal to noise ratio which is preferred for best image processing and enrollment of a fingerprint image, and a minimal signal to noise ratio, which is a value of signal to noise ratio is minimally acceptable for image processing and enrollment of a fingerprint image. An example target signal to noise ratio might be about +30 dB, while an example minimal signal to noise ratio might be about +15 dB.

In response to determining the amount of processing required, the fingerprint recognition sensor associates with the target signal to noise ratio an amount of target processing time, and associates with the minimal signal to noise ratio an amount of minimal processing time. For example, an amount of processing time can be relatively larger when complex signal processing is applied, or when substantial numbers of individual fingerprint images are averaged.

While the target signal to noise ratio is preferred, if the amount of processing to reach that target signal to noise ratio is too much greater than the amount of processing to reach the minimal signal to noise ratio, the fingerprint recognition sensor can decide to allocate only the amount of processing to reach the minimal signal to noise ratio. For example, if the ratio of target signal to noise ratio processing time to minimal signal to noise ratio processing time exceeds 2:1, the fingerprint recognition sensor can decide to allocate only the minimal signal to noise ratio processing time.

In one embodiment, it is desirable both to maximize the signal to noise ratio for the fingerprint image, and to minimize the amount of processing time. Maximizing the signal to noise ratio has the effect that the fingerprint image has best image quality, and is least subject to blurring, motion, and other artifacts. However, minimizing processing time has the effect that the user has less time to wait while the fingerprint image is processed, more fingerprint images can be processed in any given time, and the user's tendency to attempt to bypass fingerprint recognition (such as by limiting enrollment to only one or two fingers) is mitigated. This has the effect that it is desirable to apply an amount of correction which is responsive to a tradeoff between image quality and time needed for image capture. Moreover, since fingerprint capture time is relatively long with respect to user patience, it is desirable to make use of as many captured fingerprint images as possible.

In alternative embodiments, the fingerprint recognition sensor can decide to allocate some intermediate amount of processing time. In one such alternative, the fingerprint recognition sensor may determine an intermediate value which maximizes a value in response to intermediate signal to noise ratio and intermediate processing time. For example, the fingerprint recognition sensor may maximize a ratio of signal to noise ratio (exceeding the signal to noise ratio for performing no signal processing at all) to processing time.

Swatch Error Versus Edge Stitching Error

Figure 4:
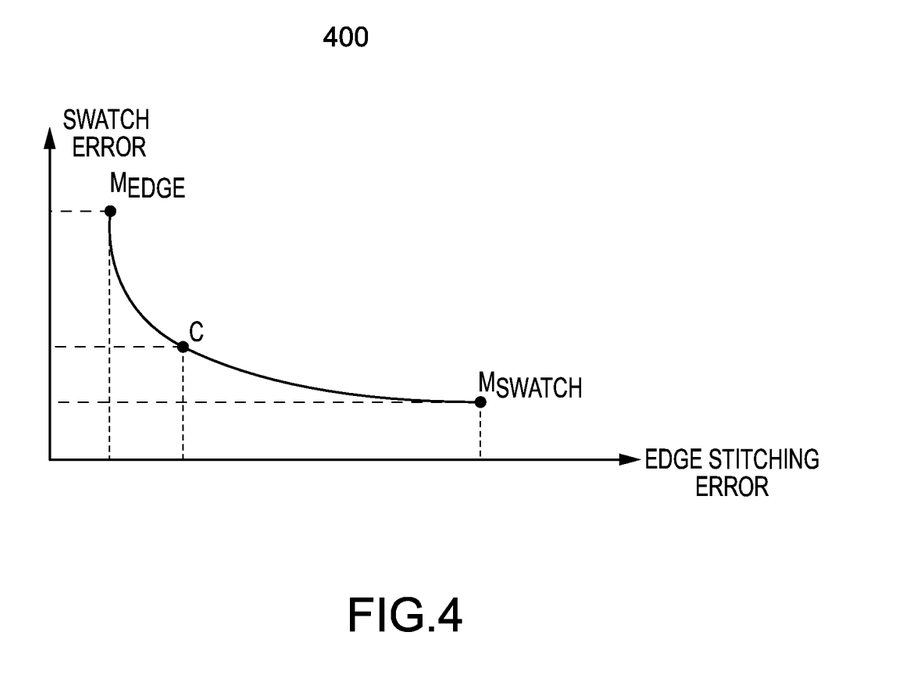
FIG. 4 shows a conceptual drawing of a comparison between swatch error and edge stitching error.

FIG. 4 shows graph 400 illustrating an example relationship between swatch error and edge stitching error.

In one embodiment, similar to the tradeoff between signal to noise ratio and processing time, the fingerprint recognition sensor also attempts to optimize its tradeoff between a degree of error for individual swatches and a degree of error for edge stitching between neighboring swatches. As each type of error affects the quality of the fingerprint image, this has the effect that it is desirable to apply an amount of correction which is responsive to a tradeoff between both types of error.

In one embodiment, for any particular signal processing operation to make a correction to the fingerprint image, the fingerprint recognition sensor determines an amount of individual swatch error that would be present before and after that operation, and an amount of edge stitching error that would be present before and after that operation. For a first example, if the signal processing operation attempts to match the neighboring swatches at their mutual edge, the amount of individual swatch error might be relatively increased, while the amount of edge stitching error might be relatively decreased. For a second example, if the signal processing operation attempts to increase the amount of information in an individual swatch, the amount of individual swatch error might be relatively decreased, while the amount of edge stitching error might be relatively increased.

For some signal processing operations, involving some amount of computation, both the amount of individual swatch error and the amount of edge stitching error might be relatively decreased. In one embodiment, the fingerprint recognition sensor can attempt to minimize both types of error. For example, the fingerprint recognition sensor can attempt to minimize a sum of both types of error. In one example, a point "C" indicates a result of some computation, in which the sum of both types of error has been relatively minimized.

In one embodiment, the fingerprint recognition sensor can also attempt to minimize an amount of processing required to minimize both types of error, similarly to minimizing an amount of processing while maximizing a signal to noise ratio. In such embodiments, the fingerprint recognition sensor can determine a value responsive to both types of error, and also responsive to an amount of processing used to minimize those types of error.

Figure 7:
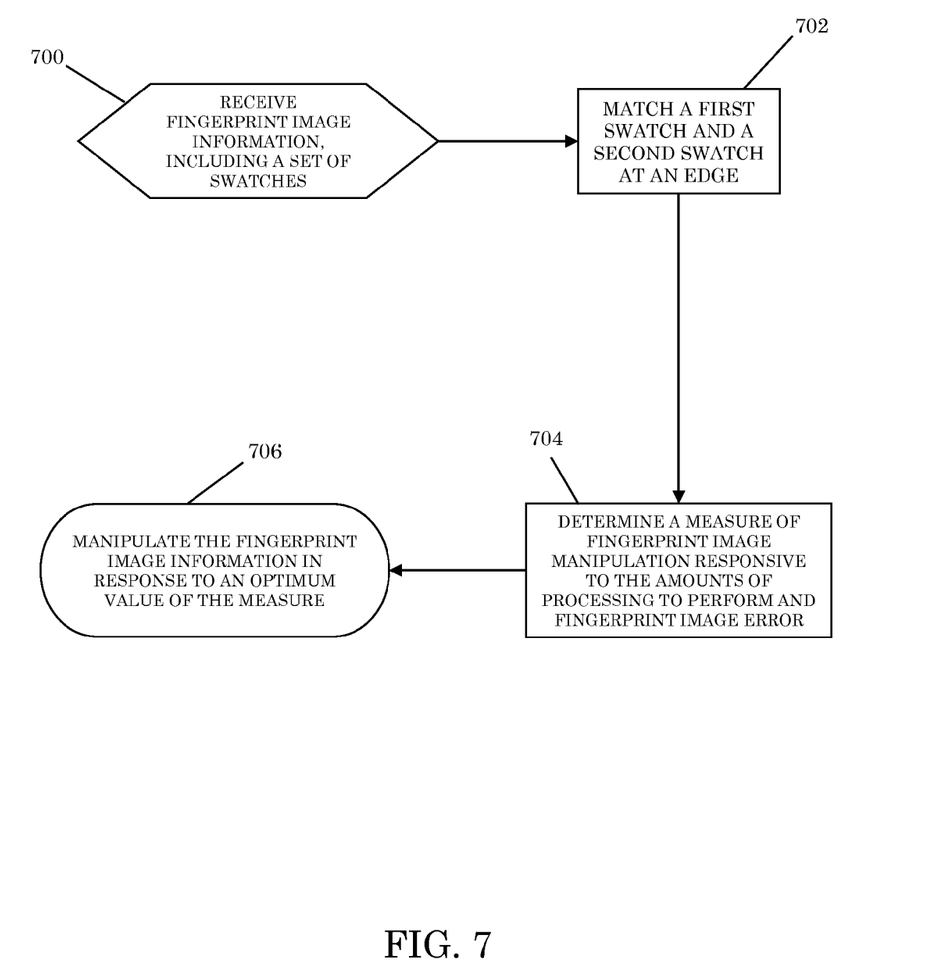
FIG. 7 is a flowchart illustrating an example error correction method, as described herein.

FIG. 7 is a flowchart illustrating an example error correction method, as described in the sections above. One skilled in the art may understand the various features of the following example method in view of the description above. The example error correction method of FIG. 7 begins with receiving fingerprint image information that includes a set of swatches, step 700. A first one of the received swatches is matched to a second one of the received swatches at an edge, step 702. The matching procedure may use any of the example matching procedures described above.

A measure of fingerprint image manipulation is determined responsive to an amount of processing that is to be performed and an amount of fingerprint image error, step 704. This measure of fingerprint image manipulation may be any of the example measures of fingerprint image manipulation described above. The fingerprint image information is then manipulated in response to an optimum value of the measure, step 706, as described above.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. An error correction method, comprising:
   receiving fingerprint image information including a set of swatches;
   matching a first one of the swatches and a second one of the swatches at an edge;
   determining a measure of fingerprint image manipulation responsive to an amount of individual swatch error and an amount of edge stitching error, the determining comprising:
   determining the amount of individual swatch error that would be present before and after each one of a set of possible operations of manipulating the fingerprint image information; and
   determining the amount of edge stitching error that would be present before and after each one of the set of possible operations of manipulating the fingerprint image information; and
   manipulating the fingerprint image information based on one or more determined values of the measures.

2. The error correction method of claim 1, further comprising:
   summing the amounts of individual swatch error and the amounts of edge stitching error for each of the possible operations of manipulating the fingerprint image information; and
   selecting a possible operation of manipulating the fingerprint image information that has a minimum value for sum of the individual swatch error and the edge stitching error.

3. A mobile communication device, comprising:
   a processor,
   a touch screen communicatively coupled to the processor, the touch screen adapted to receive input through a user contacting or nearly contacting a surface of the touch screen; and
   a fingerprint sensor communicatively coupled to the processor and to the touch screen, the fingerprint sensor adapted to acquire fingerprint image information for one or more fingers of the user as the user enters touch input through the touch screen, wherein the fingerprint image information includes a set of swatches;
   wherein the processor is configured to:
   at least match a first one of the swatches and a second one of the swatches at an edge;
   determine a first signal to noise ratio for the first one of the swatches, the first signal to noise ratio corresponding to an amount of information missing from the first one of the swatches;
   determine at least one measure of fingerprint image manipulation based on one or more other signal to noise ratios and an amount of processing time associated with each signal to noise ratio; and
   manipulate the first one of the swatches based on a selected signal to noise ratio, the selected signal to noise ratio selected from the one or more other signal to noise ratios.

4. The mobile communication device of claim 3, wherein the processor is further configured to determine a third signal to noise for the second one of the swatches, the third signal to noise ratio corresponding to an amount of information missing from the second one of the swatches.

5. The mobile communication device of claim 4, wherein the processor is further configured to select a signal to noise ratio to maximize the signal to noise ratio for the fingerprint image and minimize an amount of processing time needed to substantially obtain the selected signal to noise ratio.

6. The mobile communication device of claim 3, wherein the selected signal to noise ratio comprises one of:
   a target signal to noise ratio that is optimal for image processing and enrollment of the fingerprint image or
   a minimal signal to noise ratio that is minimally acceptable for image processing and enrollment of the fingerprint image.

7. The mobile communication device of claim 6, wherein the processor is further configured to:

determine an amount of processing time associated with the target signal to noise ratio; and determine an amount of processing time associated with the minimal signal to noise ratio.

8. The mobile communication device of claim 7, wherein the processor is further configured to:

compare the amount of processing time associated with the target signal to noise ratio to the amount of processing time associated with the minimal signal to noise ratio;

in the event that the amount of processing time associated with the target signal to noise ratio does not exceed the amount of processing time associated with the minimal signal to noise ratio by a predetermined amount, allocate the amount of processing time associated with the target signal to noise ratio to substantially obtain the target signal to noise ratio; and in the event that the amount of processing time associated with the target signal to noise ratio exceeds the amount of processing time associated with the minimal signal to noise ratio by the predetermined amount, allocate only the amount of processing time associated with the minimal signal noise ratio to substantially obtain the minimal signal to noise ratio.

9. The mobile communication device of claim 3, wherein the processor is further configured to:

determine an amount of individual swatch error that would be present before and after each one of a set of possible operations of manipulating the fingerprint image information; and determine an amount of edge stitching error that would be present before and after each one of the set of possible operations of manipulating the fingerprint image information.

10. The mobile communication device of claim 9, wherein the processor is further configured to sum the amounts of individual swatch error and the amounts of edge stitching error for each of the possible operations of manipulating the fingerprint image information; and select a possible operation of manipulating the fingerprint image information that has a minimum value for sum of the individual swatch error and the edge stitching error.

11. An error correction method for fingerprint image processing, the method comprising:

receiving fingerprint image information including a set of swatches;

matching a first one of the swatches and a second one of the swatches at an edge;

examining one or more portions of the first one of the swatches and the second one of the swatches for artifacts;

determining a degree of correction to be applied to each individual portion of the first one and the second one of the swatches based on a degree of individual swatch errors for the first one of the swatches and the second one of the swatches and a degree of errors for edge stitching between the first one and the second one of the swatches, the determining comprising:

determining an amount of individual swatch error that would be present before and after each one of a set of possible operations of manipulating the first one and the second one of the swatches; and determining an amount of edge stitching error that would be present before and after each one of the set of possible operations of manipulating the first one and the second one of the swatches; and manipulating at least one of the first one and the second one of the swatches based on a particular value of the degree of correction.

12. The error correction method of claim 11, further comprising:

summing the amounts of individual swatch error and the amounts of edge stitching error for each of the possible operations of manipulating the first one and the second one of the swatches; and selecting a possible operation of manipulating at least one of the first one and the second one of the swatches that has a minimum value for sum of the individual swatch error and the edge stitching error.

* * * * *